(12) United States Patent
Mizuhara

(10) Patent No.: US 6,694,348 B1
(45) Date of Patent: Feb. 17, 2004

(54) DATA COMMUNICATION SYSTEM AND TIME SLOT ALLOCATING METHOD

(75) Inventor: Bun Mizuhara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/566,943

(22) Filed: May 8, 2000

(30) Foreign Application Priority Data

May 12, 1999 (JP) .......................................... 11-131226

(51) Int. Cl.[7] .............................................. G06F 15/16
(52) U.S. Cl. ........................ 709/201; 709/238; 370/230; 370/346; 370/347; 714/6; 710/310
(58) Field of Search ................................ 709/201, 238; 370/347, 230, 346; 713/201; 710/310; 714/6

(56) References Cited

U.S. PATENT DOCUMENTS

| | | | | |
|---|---|---|---|---|
| 5,524,270 A | * | 6/1996 | Haess et al. ................. | 710/310 |
| 5,594,738 A | * | 1/1997 | Crisler et al. ............... | 370/347 |
| 5,956,321 A | * | 9/1999 | Yao et al. .................... | 370/230 |
| 5,970,063 A | * | 10/1999 | Chapman et al. ........... | 370/346 |
| 6,041,359 A | * | 3/2000 | Birdwell ...................... | 709/238 |
| 6,049,891 A | * | 4/2000 | Inamoto ........................ | 714/6 |
| 6,289,461 B1 | * | 9/2001 | Dixon ........................ | 713/201 |

FOREIGN PATENT DOCUMENTS

| | | |
|---|---|---|
| EP | 726 661 | 8/1996 |
| JP | 7-135502 | 5/1995 |
| JP | 10-107755 | 4/1998 |
| JP | 10-242981 | 9/1998 |
| JP | 11-69431 | 3/1999 |
| JP | 2000-69550 | 3/2000 |

* cited by examiner

*Primary Examiner*—David Wiley
*Assistant Examiner*—Thanh T. Nguyen
(74) *Attorney, Agent, or Firm*—Foley & Lardner

(57) ABSTRACT

In the data communication system, a terminal station includes a data buffer and a terminal station side finite state machine for, when data is accumulated at the data buffer, periodically making a request for allocation of time slots to a base station until the accumulated data is all transmitted, and the base station includes a base station side finite state machine for, when accepting a time slot allocation request from the terminal station, if a free time slot exists, allocating the free time slot to the terminal station in question and if not, making other terminal station which has been already allocated a time slot release the allocated time slot and allocating the released time slot to the terminal station which has made the time slot allocation request, and the terminal station transmits data using a time slot allocated by the base station side finite state machine.

22 Claims, 13 Drawing Sheets

DATA COMMUNICATION SYSTEM AND TIME SLOT ALLOCATING METHOD

BACKGROUND OF THE INVENTION

1. Field of the Invention

The present invention relates to a data communication system and a time slot allocation method for conducting data communication between one base station and a plurality of terminal stations and, more particularly, to a data communication system and a time slot allocation method for efficiently allocating time slots in time-sharing communication from a terminal station to a base station.

2. Description of the Related Art

With a data communication system for conducting data communication between one base station and a plurality of terminal stations, data communication between the base station and the terminal stations is conventionally realized by allocation of time slots by polling. One of conventional data communication techniques of this kind, for example, is the art disclosed in Japanese Patent Laying-Open (Kokai) No. Hesei 10-242981.

FIG. 14 shows a schematic structure of a data communication system disclosed in the above literature. With reference to FIG. 14, a terminal station 110 and a base station 120 are connected through an up-link side transmission line 130 for transferring data from the terminal station 110 to the base station 120 (upward) and a down-link side transmission line 140 for transferring data from the base station 120 to the terminal station 110 (downward). Although FIG. 14 illustrates only one terminal station 110 for convenience' sake, a plurality of terminal stations 110 are actually connected through the up-link side transmission line 130 and the down-link side transmission line 140.

The terminal station 110 includes a polling wait buffer 111 for holding polling wait information, a polling request generation unit 112 for detecting a buffer length of the polling wait buffer 111 and comparing the buffer length and a predetermined threshold value to generate a polling request according to a comparison result, and a multiplexing unit 113 for multiplexing output of the polling wait buffer 111 and output of the polling request generation unit 112 and sending the multiplexed output onto the up-link side transmission line 130 to transfer the output to the base station 120.

The base station 120 includes a polling request identification unit 121 for identifying a polling request from the terminal station 110 transferred through the transmission line 130, a minimum guaranteed polling generation unit 122 for generating minimum guaranteed polling, and a shared band control unit 123 responsive to output of the minimum guaranteed polling generation unit 122 and output of the polling request identification unit 121 for allotting a time slot to a free region of a minimum guaranteed polling according to the amount of polling wait information. Output of the shared band control unit 123 is transferred to each terminal station 110 through the down-link side transmission line 140 to conduct polling.

According to thus structured conventional data communication system, first, at the terminal station 110, a polling request is generated according to an information wait state of the polling wait buffer 111 and the generated polling request is notified to the base station 120 through the transmission line 130. Then, at the base station 120, the polling request sent from the terminal station 110 is analyzed to insert a polling pattern into a free region of the polling generated at the minimum guaranteed polling generation unit 122 according to the polling request. The polling pattern in question is notified to each terminal station 110 through the transmission line 140. Because a polling pattern is determined according to a polling request generated at the terminal station 110, allocation of time slots to each terminal station 110 can be efficiently conducted in the system as a whole.

The polling request generation unit 112 compares the amount of information queuing at the polling wait buffer 111 and a predetermined threshold value and notifies the base station 120 of information indicating whether the amount of the wait information in question is larger or smaller than the threshold value in question. Then, the base station 120 changes a polling pattern based on the information in question. The base station 120 is therefore allowed to change a polling pattern dynamically according to a polling request from the terminal station 110, so that allocation of time slots to the respective terminal stations 110 can be more efficiently conducted in the system as a whole.

The polling request generation unit 112 also compares the amount of information queuing at the polling wait buffer 111 and a plurality of threshold values and notifies the base station 120 of information indicating which threshold value the amount of wait information in question exceeds. Then, the base station 120 changes a polling pattern based on the information in question. The base station 120 is therefore allowed to set a polling pattern appropriately according to the amount of wait information.

The above-described conventional data communication system, however, requires a terminal station to monitor a state of a polling wait buffer, which burdens processing at the terminal station.

Another shortcoming is that even when a terminal station has none of data to be transmitted, minimum guaranteed polling and response thereto are conducted to wastefully consume time slots.

A further shortcoming is that a burst of data traffic can not be coped with because information notified from a terminal station to a base station together with a polling request only includes the amount of information queuing at a polling wait buffer.

A still further shortcoming is that since there is no method of transcendentally finding a relationship between the amount of information existing in a polling wait buffer and a time slot necessary for transferring the information amount in question, even if a time slot is allocated based on the amount of information existing in the polling wait buffer, the allocation is not always optimum.

Moreover, periodic analyses of polling information obtained from a base station by polling burdens processing at the base station.

SUMMARY OF THE INVENTION

An object of the present invention is to overcome the shortcomings of the above-described conventional techniques and provide a data communication system for appropriately and efficiently allocating time slots without the need of monitoring of a buffer at a terminal station and the need of polling by a base station.

According to the first aspect of the invention, a data communication system having one base station and a plurality of terminal stations for conducting data communication from the terminal stations to the base station as time-sharing communication, wherein the terminal station comprises
a data buffer for storing data to be transmitted, and
time slot allocation request means for, when data is accumulated at the data buffer, periodically making a request for allocation of time slots to the base station until the accumulated data is all transmitted, and
the base station comprises
time slot allocation means for, when accepting a time slot allocation request from the terminal station, if a free time slot exists, allocating the free time slot to the terminal station and if not, making other the terminal station which has been already allocated a time slot release the allocated time slot and allocating the released time slot to the terminal station which has made the time slot allocation request,
the data buffer of the terminal station transmitting data using a time slot allocated by the time slot allocation means of the base station.

In the preferred construction, the time slot allocation means of the base station allocates time slots with a predetermined number of slots added thereto in response to continuous time slot allocation requests from the time slot allocation request means of the terminal stations.

In another preferred construction, the time slot allocation means of the base station increases the number of time slots to be allocated in response to continuous time slot allocation requests from the time slot allocation request means of the terminal stations by stages according to the number of requests.

In another preferred construction, the time slot allocation means of the base station, in response to continuous time slot allocation requests from the time slot allocation request means of the terminal stations, makes, for each request, the terminal station holding the largest number of time slots among the terminal stations holding more time slots than those held by the base station release a necessary number of time slots.

In another preferred construction, the time slot allocation means of the base station allocates time slots with a predetermined number of slots added thereto in response to continuous time slot allocation requests from the time slot allocation request means of the terminal stations, and
the time slot allocation means of the base station, in response to continuous time slot allocation requests from the time slot allocation request means of the terminal stations, makes, for each request, the terminal station holding the largest number of time slots among the terminal stations holding more time slots than those held by the base station release a necessary number of time slots.

In another preferred construction, the time slot allocation means of the base station increases the number of time slots to be allocated in response to continuous time slot allocation requests from the time slot allocation request means of the terminal stations by stages according to the number of requests, and
the time slot allocation means of the base station, in response to continuous time slot allocation requests from the time slot allocation request means of the terminal stations, makes, for each request, the terminal station holding the largest number of time slots among the terminal stations holding more time slots than those held by the base station release a necessary number of time slots.

According to the second aspect of the invention, in a data communication system having one base station and a plurality of terminal stations for conducting data communication from the terminal stations to the base station as time-sharing communication, a time slot allocation method of allocating time slots to the terminal stations, comprising the steps of:
when data is accumulated at the data buffer, periodically making a request for allocation of time slots by the terminal station to the base station until the accumulated data is all transmitted; and
when the base station accepts a time slot allocation request from the terminal station, if a free time slot exists, allocating the free time slot by the base station to the terminal station and if not, making other the terminal station which has been already allocated a time slot release the allocated time slot and allocating the released time slot to the terminal station which has made the time slot allocation request.

In the preferred construction, the base station allocates time slots with a predetermined number of slots added thereto in response to continuous time slot allocation requests from the terminal stations.

In another preferred construction, the base station increases the number of time slots to be allocated in response to continuous time slot allocation requests from the terminal stations by stages according to the number of requests.

In another preferred construction, the base station, in response to continuous time slot allocation requests from the terminal stations, makes, for each request, the terminal station holding the largest number of time slots among the terminal stations holding more time slots than those held by the base stations release a necessary number of time slots.

In another preferred construction, the base station allocates time slots with a predetermined number of slots added thereto in response to continuous time slot allocation requests from the terminal stations, and
the base station, in response to continuous time slot allocation requests from the terminal stations, makes, for each request, the terminal station holding the largest number of time slots among the terminal stations holding more time slots than those held by the base station release a necessary number of time slots.

In another preferred construction, the base station increases the number of time slots to be allocated in response to continuous time slot allocation requests from the terminal stations by stages according to the number of requests, and
the base station, in response to continuous time slot allocation requests from the terminal stations, makes, for each request, the terminal station holding the largest number of time slots among the terminal stations holding more time slots than those held by the base station release a necessary number of time slots.

According to another aspect of the invention, a computer readable memory storing a time slot allocation control program for controlling a data communication system having one base station and a plurality of terminal stations for conducting data communication from the terminal stations to the base station as time-sharing communication to allocate time slots to the terminal stations, the time slot allocation control program comprising the steps of:
controlling the terminal stations to, when data is accumulated at the data buffer, periodically make a request for allocation of time slots to the base station until the accumulated data is all transmitted, and
controlling the base station to, when the base station accepts a time slot allocation request from the terminal station, if a free time slot exists, allocate the free time slot to the terminal station and if not, make other the terminal station which has been already allocated a time slot release the allocated time slot and allocate the released time slot to the terminal station which has made the time slot allocation request.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
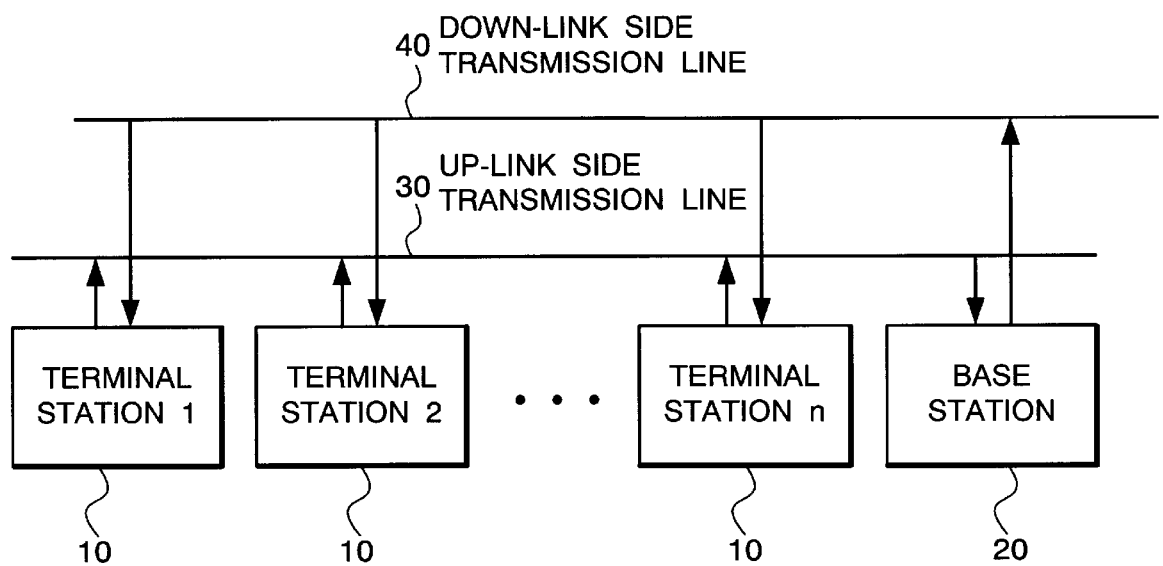
FIG. 1 is a schematic diagram showing a structure of a data communication system according to one embodiment of the present invention.
Figure 2:
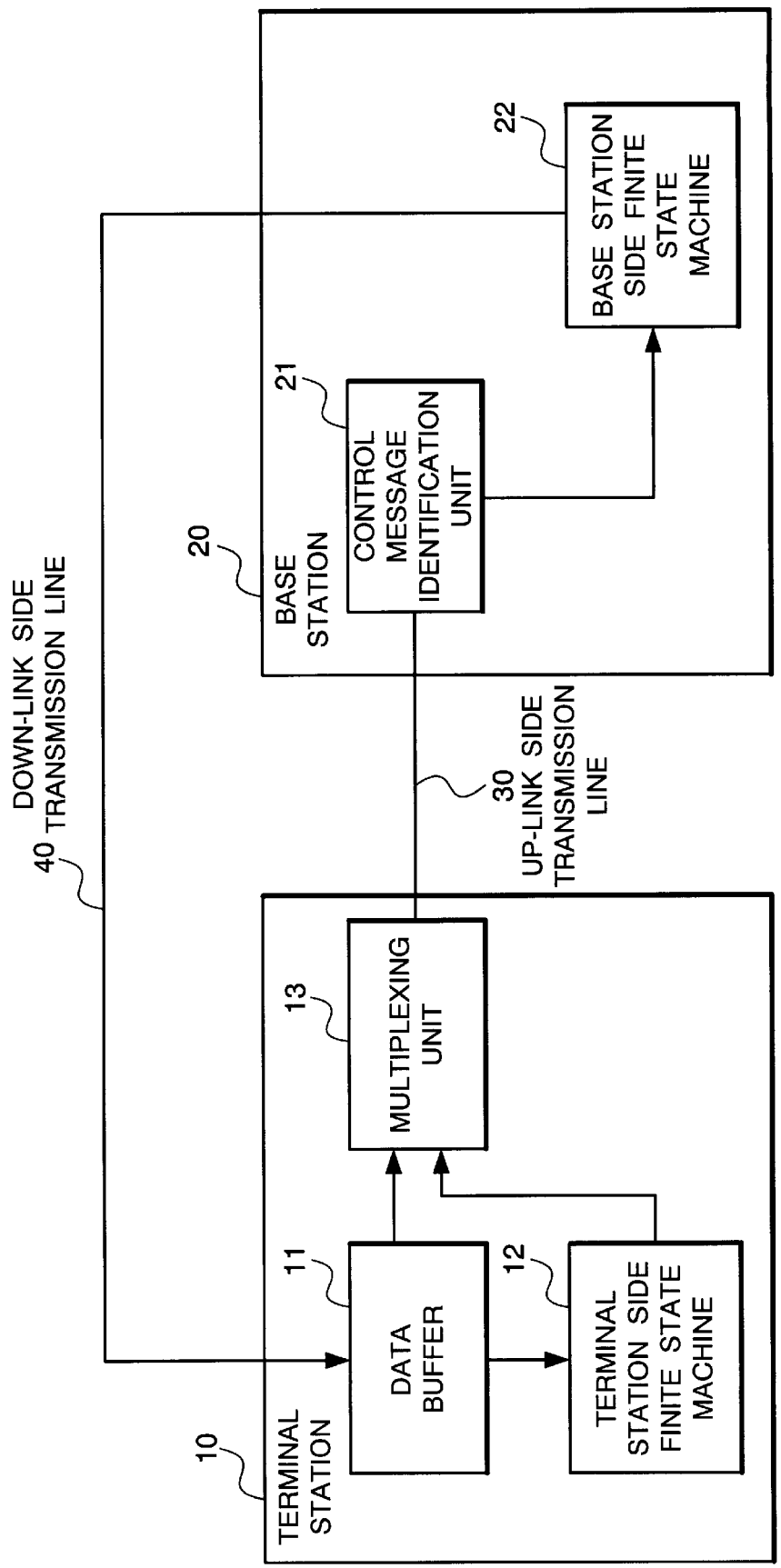
FIG. 2 is a block diagram showing structures of a base station and a terminal station and a connection relation therebetween in the data communication system of FIG. 1.

FIG. 1 is a schematic diagram showing a structure of a data communication system according to one embodiment of the present invention and FIG. 2 is a block diagram showing structures of a base station and a terminal station and a connection relationship therebetween in the data communication system of FIG. 1. As illustrated in FIG. 1, the data communication system of the present embodiment has a plurality (a number n) of terminal stations 10 and one base station 20 connected through an up-link side transmission line 30 for transferring data from the terminal stations 10 to the base station 20 (upward) and a down-link side transmission line 40 for transferring data from the base station 20 to the terminal stations 10 (downward). In the present embodiment, in a downward direction, broadcast communication from the base station 20 to all the terminal stations 10 is conducted and in an upward direction, time-sharing communication is conducted. In addition, no communication is conducted between the terminal stations 10 without the intervention of the base station 20.

With reference to FIG. 2, the terminal station 10 includes a data buffer 11 for storing data to be transmitted, a terminal station side finite state machine 12 for generating a time slot allocation request for data transmission, and a multiplexing unit 13 for transmitting data output from the data buffer 11 and a time slot allocation request output from the terminal station side finite state machine 12 to the base station 20 through the up-link side transmission line 30.

The base station 20 includes a control message identification unit 21 for receiving a time slot allocation request sent from the terminal station 10 and a base station side finite state machine 22 for executing allocation of a time slot to the relevant terminal station 10 according to a time slot allocation request received at the control message identification unit 21. If a free time slot exists, the base station side finite state machine 22 allocates the free slot to the terminal station 10 which has made the time slot allocation request in question and transmits the information indicating that allocation has been conducted to the terminal station 10 in question through the down-link side transmission line 40.

The components of the terminal stations 10 and the base station 20 are implemented by program-controlled CPUs and internal memories of various computer systems connected over a network composed of the up-link side transmission line 30 and the down-link side transmission line 40. A computer program for controlling the CPU is presented being stored in a common storage medium such as a magnetic disc, an optical disc or a semiconductor memory and is loaded into an internal memory to execute functions of the respective components. In FIGS. 1 and 2, illustration is made only of a characteristic part of the structure of the present embodiment and that of the remaining common part is omitted.

Figure 3:
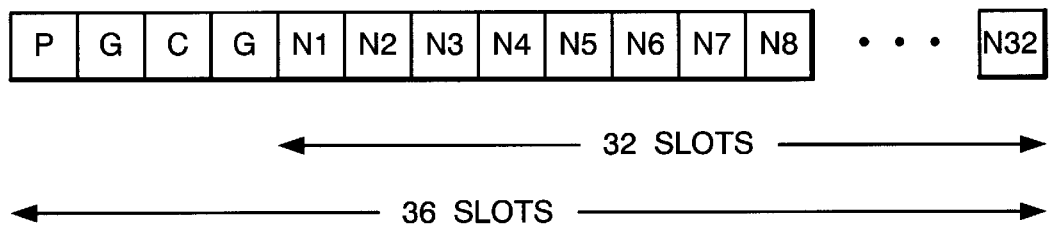
FIG. 3 is a diagram showing a structure of a time slot for use in the present embodiment.

FIG. 3 shows a structure of a time slot for use in transferring data from the terminal station 10 to the base station 20. With reference to FIG. 3, the first slot (P) is a polling slot which is mainly used for synchronizing the base station 20 and the terminal stations 10 and for the checking of normal operation with each other. The third slot (C) is a contention slot which is used for making a reservation of the fifth and the following slots for use in data transmission. The second and fourth slots (G) are guard slots which are for use to prevent a delay of signals to be sent to the P slot and the C slot from affecting communication of other slots. These four slots are not used in data transfer. 32 slots, from the fifth slot to the 36-th slot (N1–N32) are slots for use in actually sending data. As described above, reservation of a slot in question is made by using the C slot.

Operation of the present embodiment will be described next. In the following description, each message used by the present embodiment is generated based on the protocol recited in Chapter 7.11 of DAVIC 1.3 Specification Part 8 Lower Layer Protocols and Physical Interfaces (Technical Specification) Revision 6.3 defined by DAVIC (Digital Audio-Visual Council).

First, the terminal station 10 conducts operation for the entry into the base station 20 using the P slot and synchronizes a frequency and a time slot with the base station 20, whereby communication is enabled. Since the entry operation is detailed in the above-described literature and it is not directly related to the present invention, no detailed description will be made thereof here.

When data to be sent is generated at the terminal station 10, the terminal station 10 in question sends a reservation_request message using the C slot to the base station 20. According to above-described literature, a request for a time slot is made with the message set to have a field of a num_time_slots for designating the number of time slots required by the terminal station 10 and a field of min_VBR_packet_size for designating a size of data accumulated in the data file 11 of the terminal station 10. In the present embodiment, however, predetermined values (fixed values) are set in these fields. Then, the base station 20 which has received the message ignores these values of fields.

Figure 4:
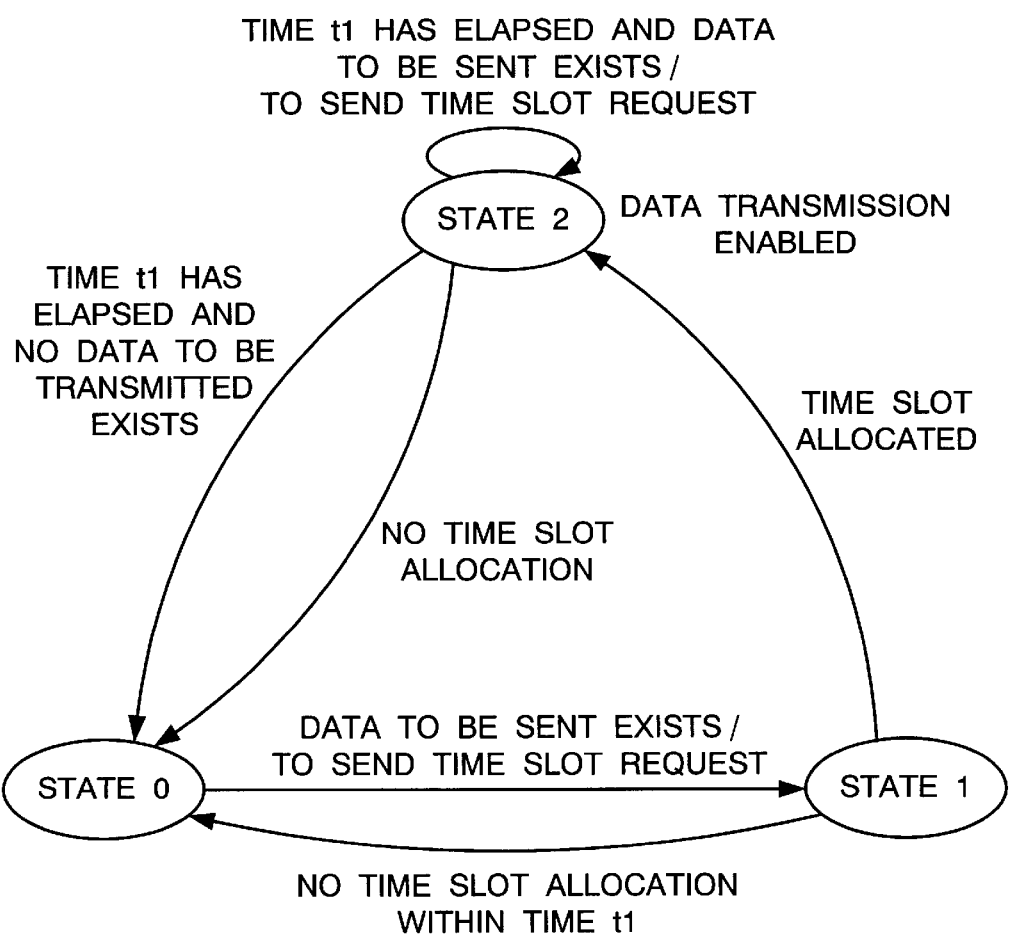
FIG. 4 is a diagram showing state transition of a terminal station side finite state machine of the terminal station in the present embodiment.
Figure 5:
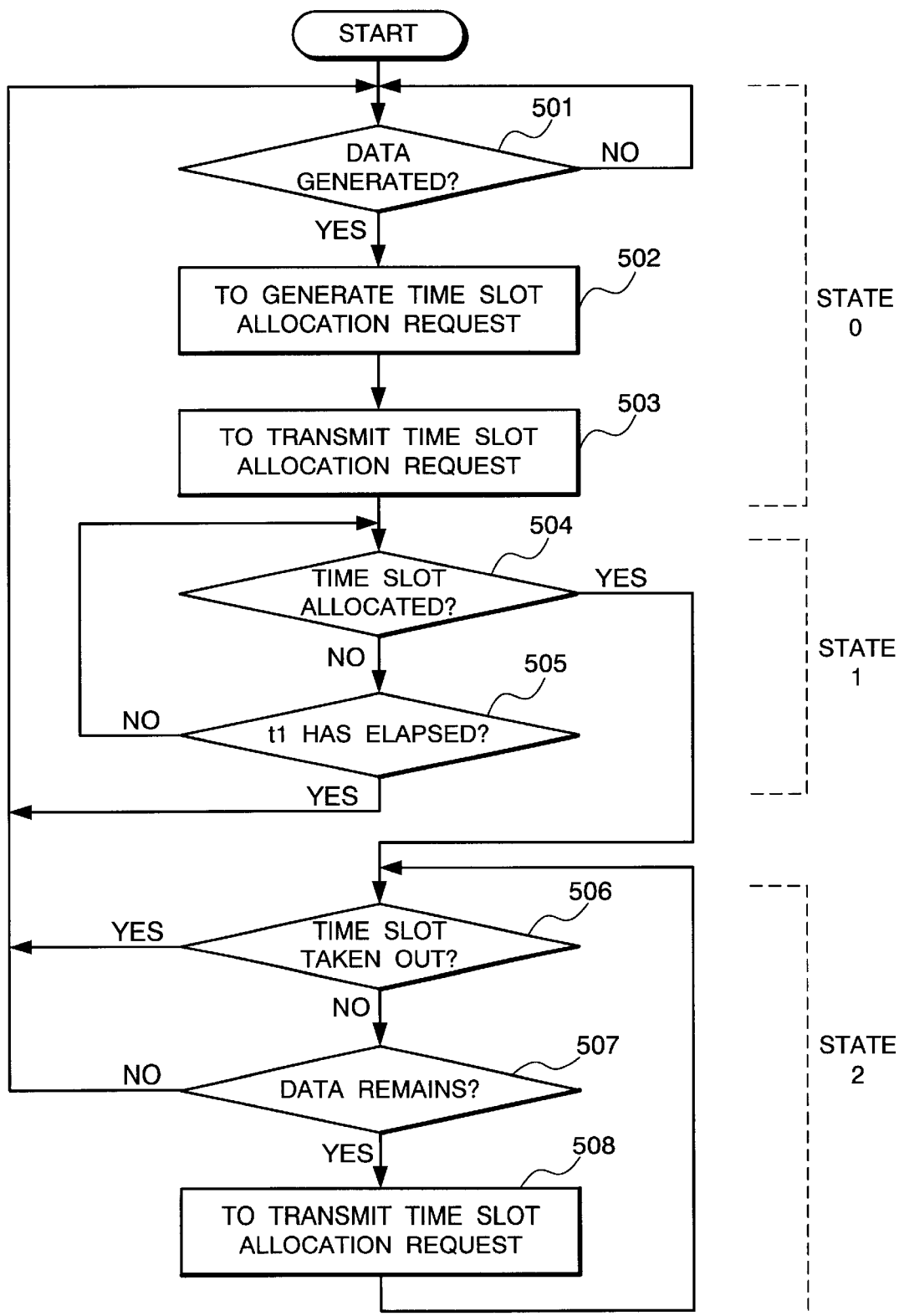
FIG. 5 is a flow chart showing operation of the terminal station in the present embodiment.
Figure 6:
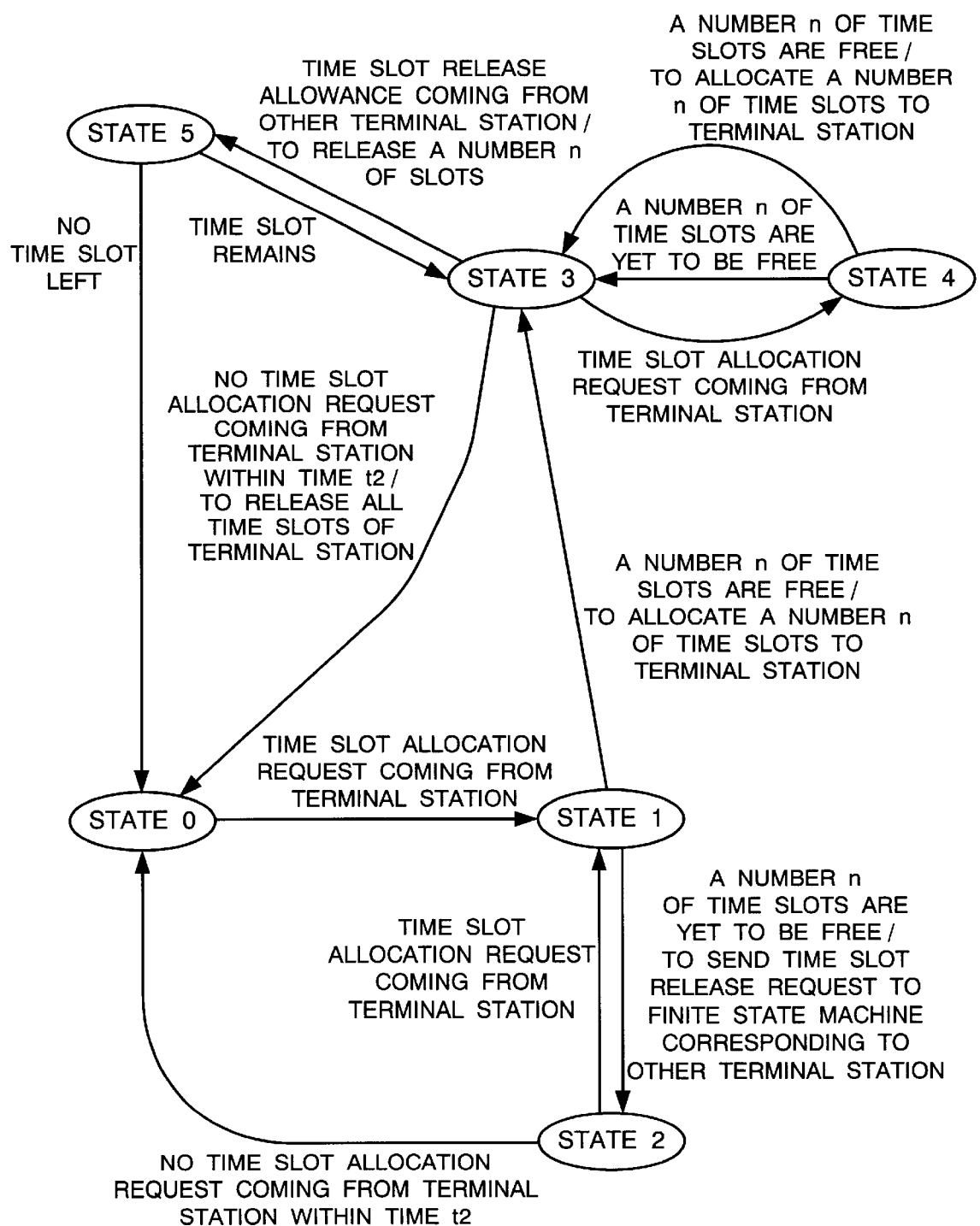
FIG. 6 is a diagram showing state transition of a base station side finite state machine of the base station in the present embodiment.
Figure 7:
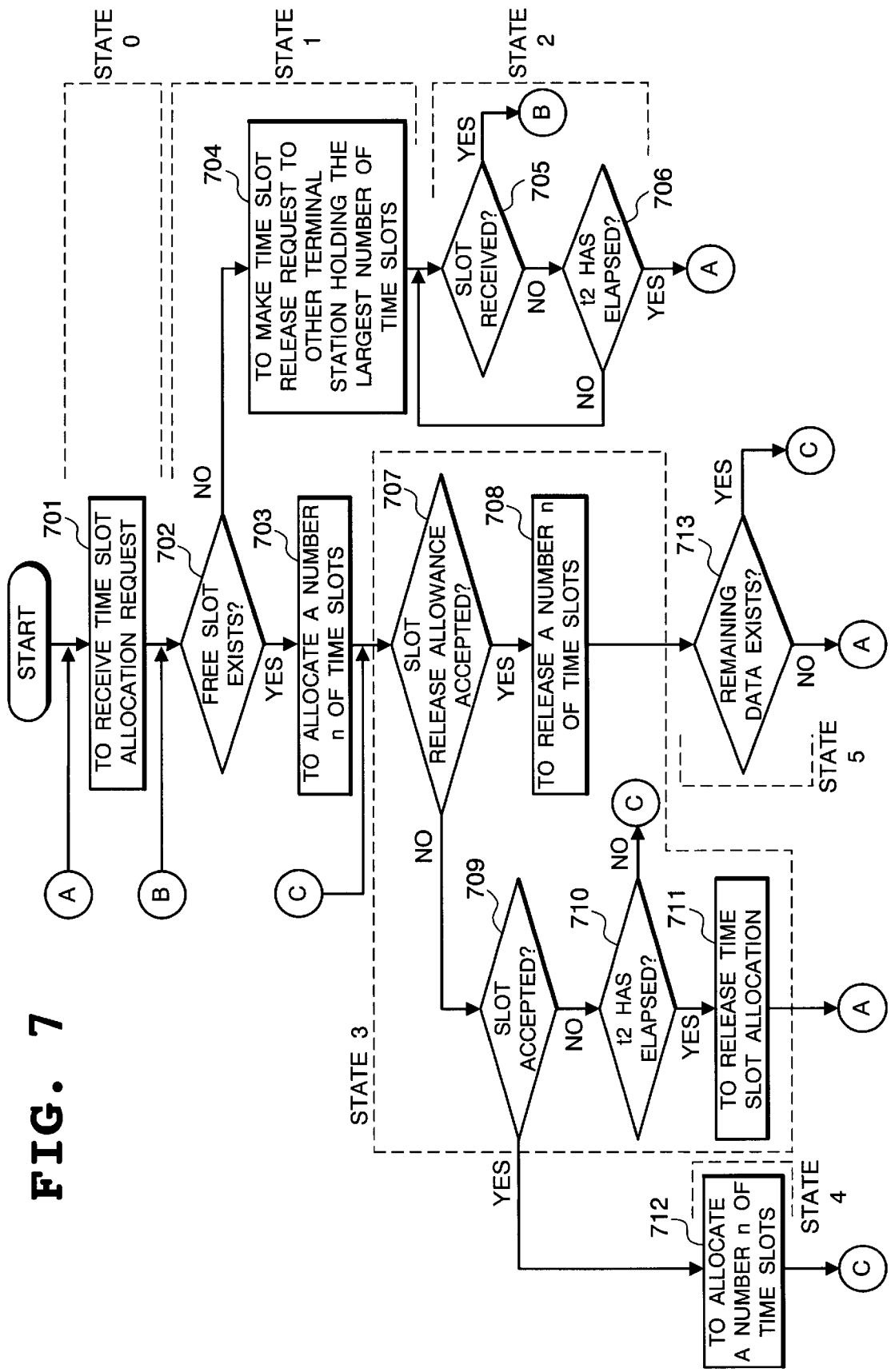
FIG. 7 is a flow chart showing operation of the base station in the present embodiment.

Description will be next made of operation of the terminal station 10 and the base station 20. FIG. 4 is a diagram showing state transition of the terminal station side finite state machine 12 of the terminal station 10 in the present embodiment, FIG. 5 is a flow chart showing operation of the terminal station 10, FIG. 6 is a diagram showing state transition of the base station side finite state machine 22 of the base station 20 in the present embodiment and FIG. 7 is a flow chart showing operation of the base station 20. Operation of the base station 20 which will be described in the following is operation related only to one terminal station 10. In reality, the base station 20 conducts the same operation for each of the plurality of terminal stations 10.

In FIG. 4, the state 0 is a state where the terminal station 10 has no time slot. As long as no data to be transmitted is generated, the terminal station 10 remains at the state 0. The state 1 is a state where the terminal station 10 has transmitted a time slot allocation request to the base station 20 and waits for time slot allocation by the base station 20. The state 2 is a state where data transmission by the terminal station 10 is enabled, at which state data is sent using a time slot allocated by the base station 20.

With reference to the flow chart of FIG. 5, operation of the terminal station 10 will be described. First, at the terminal station 10 at the state 0, when data to be transmitted is generated and stored in the data buffer 11, the terminal station side finite state machine 12 generates a time slot allocation request (Steps 501 and 502). Then, the multiplexing unit 13 transmits a time slot allocation request to the base station 20 through the up-link side transmission line 30 and the terminal station 10 shifts to the state 1 (Step 503).

When to the terminal station 10 at the state 1, a time slot is allocated by the base station 20 within a fixed time period (t1), the terminal station 10 in question shifts to the state 2 (Steps 504 and 505). When no time slot is allocated by the base station 20 within the time t1, the terminal station 10 in question returns to the state 0 to make a time slot allocation request again (Steps 504 and 505).

When at the terminal station 10 at the state 2, all the time slots are taken by the base station 20 as will be described later, the station 10 shifts to the state 0 (Step 506). The station 10 also checks at every time t1 whether data to be transmitted remains in the data buffer 11 and when the data remains, the terminal station 10 remains at the state 2 to make a time slot allocation request repeatedly until no data is left (Steps 507 and 508). When none of data to be transmitted is left, the terminal station 10 returns to the state 0 (Step 507).

In FIG. 6, the state 0 is a state where no time slot allocation request is made by the terminal station 10. The state 1 is a state where a time slot allocation request is received from the terminal station 10 and no time slot allocation is conducted for the terminal station 10 in question. The state 2 is a state of waiting for a time slot to be freed. The state 3 is a state where a time slot is allocated to the terminal station 10 which has made a time slot allocation request. The state 4 is a state where after a time slot is allocated, an additional time slot allocation request is made. The state 5 is a state where a necessary time slot is released.

Operation of the base station 20 will be described with reference to the flow chart of FIG. 7. In the present operation example, it is assumed that in response to a time slot allocation request from the terminal station 10, the base station side finite state machine 22 allocates a predetermined number (n) of time slots each. First, at the base station 20 at the state 0, when the control message identification unit 21 accepts a time slot allocation request transmitted from a predetermined terminal station 10, the unit 21 sends the time slot allocation request in question to the base station side finite state machine 22 to shift to the state 1 (Step 701).

When at the base station 20 at the state 1, a number n of free time slots exist, the station 20 allocates the number n of the free time slots to the terminal station 10 which has sent the time slot allocation request to shift to the state 3 (Steps 702 and 703). When the time slot is not free, the station 20 makes a time slot release request to the terminal station side finite state machine 12 of a terminal station 10 having the largest number of time slots among other terminal stations 10 (hereinafter referred to as other terminal station 10) than the terminal station 10 which has sent the time slot allocation request in question to shift to the state 2 (Steps 702 and 704).

At the base station 20 at the state 2, when another time slot allocation request is received from the terminal station 10 which has sent the time slot allocation request in question within a fixed time (t2) longer than the time t1, the station 20 shifts to the state 1 (Steps 705 and 706). When no time slot allocation request is made by the terminal station 10 which has sent the time slot allocation request in question within the time t2, the station 20 shifts to the state 0 (Steps 705 and 706).

When the base station 20 at the state 3 accepts allowance of slot release from the finite state machine 12 of other terminal station 10, the station 20 releases the number n of slots to shift to the state 5 (Steps 707 and 708). When no allowance of slot release arrives from the finite state machine 12 of other terminal station 10 and a further time slot allocation request is accepted from the terminal station 10 which has sent the time slot allocation request in question within the time t2, the station 20 shifts to the state 4 (Steps 707, 709 and 710). When no allowance of slot release arrives from the finite state machine 12 of other terminal station 10 and none of new time slot allocation requests is made by the terminal station 10 which has sent the time slot allocation request in question within the time t2, the station 20 releases all the allocation of time slots to the terminal station 10 in question to shift to the state 0 (Steps 707 and 709 to 711).

When at the base station 20 at the state 4, a number n of free time slots exist, the station 20 allocates the time slots to the terminal station 10 which has sent the time slot allocation request in question. Then, irrespective of whether allocation of the number n of time slots has been conducted, the station 20 returns to the state 3 (Step 712).

When at the base station 20 at the state 5, after the number n of free time slots are released, there further remains a time slot allocated to the terminal station 10 in question, the station 20 returns to the state 3 (Step 713). When the time slots allocated to the terminal station 10 in question are all released and none of the slots remains, the station 20 returns to the state 0 (Step 713).

As described in the foregoing, according to the present embodiment, when data to be transmitted exists in the terminal station 10, the terminal station repeatedly and periodically makes a time slot allocation request to the base station 20 and transmits the data in question using a time slot allocated by the base station 20, which makes it unnecessary to measure the amount of information accumulated and queuing in the data buffer 11 at the terminal station 10.

In addition, since first a small number (n) of time slots are allocated to the terminal station 10 and when the terminal station 10 in question continuously outputs a time slot allocation request, the station 20 responsively adds a number n of time slots each to the allocation, flexible allocation of time slots is possible as required.

Figure 8:
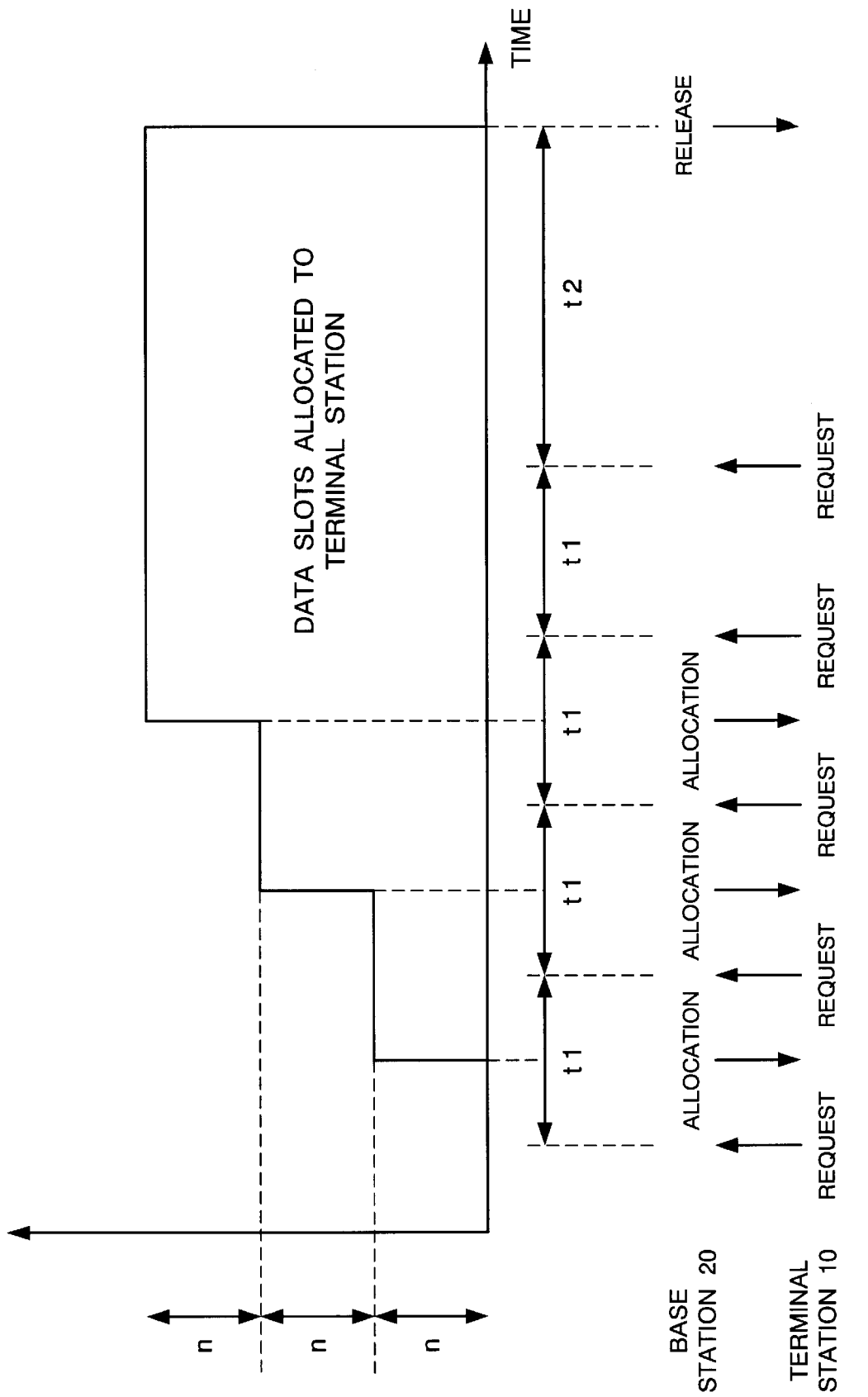
FIG. 8 is a time chart showing an execution example of time slot allocation in the present embodiment.

FIG. 8 is a time chart showing an example of execution of time slot allocation in the present embodiment. With reference to FIG. 8, after the first time slot allocation request is made by the terminal station 10, time slot allocation is requested four times every time period of t1. Then, in response to the first time slot allocation request through the third time slot allocation request, the base station 20 correspondingly allocates a number n of time slots each. However, after the fourth time slot allocation request is made until the fifth time slot allocation request is made, no time slot allocation is conducted. The terminal station 10 makes no time slot allocation request to follow after the fifth time slot allocation request is made until the time t2 elapses. Accordingly, at a time point where the time t2 has elapsed, the base station 20 will have released the time slots allocated to the terminal station 10 in question.

Next, another embodiment of the present invention will be described. A data communication system of the present embodiment is structured similarly to the data communication system of the first embodiment shown in FIGS. 1 and 2. The present embodiment differs from the first embodiment in a time slot allocation method by the base station side finite state machine 22 of the base station 20. Into the time slot allocation method of the present embodiment, a variable m is introduced which indicates how the time slot allocation in question stands among allocations to the predetermined terminal station 10.

Figure 9:
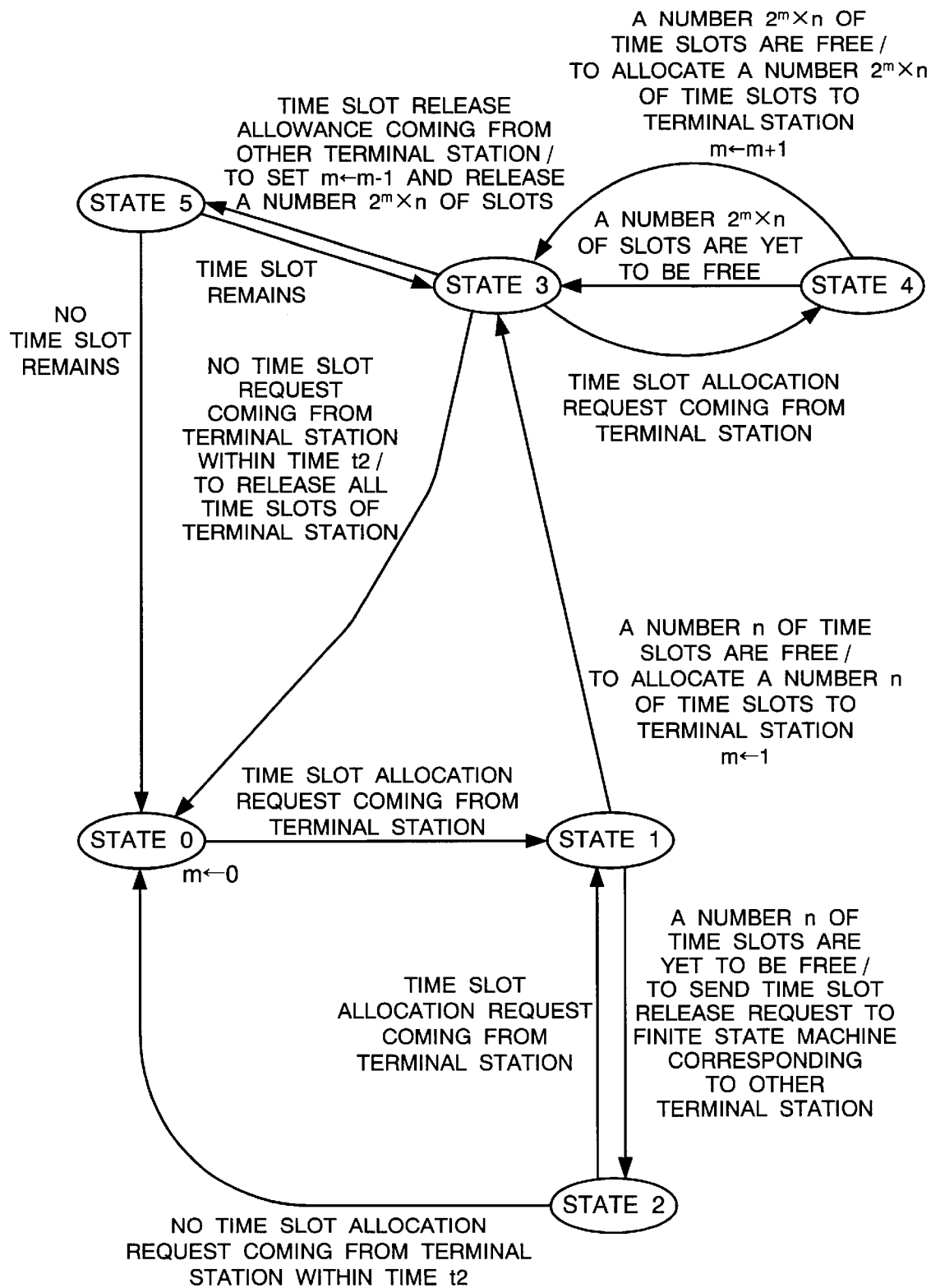
FIG. 9 is a diagram showing state transition of a base station side finite state machine of a base station constituting a data communication system according to another embodiment of the present invention.
Figure 10:
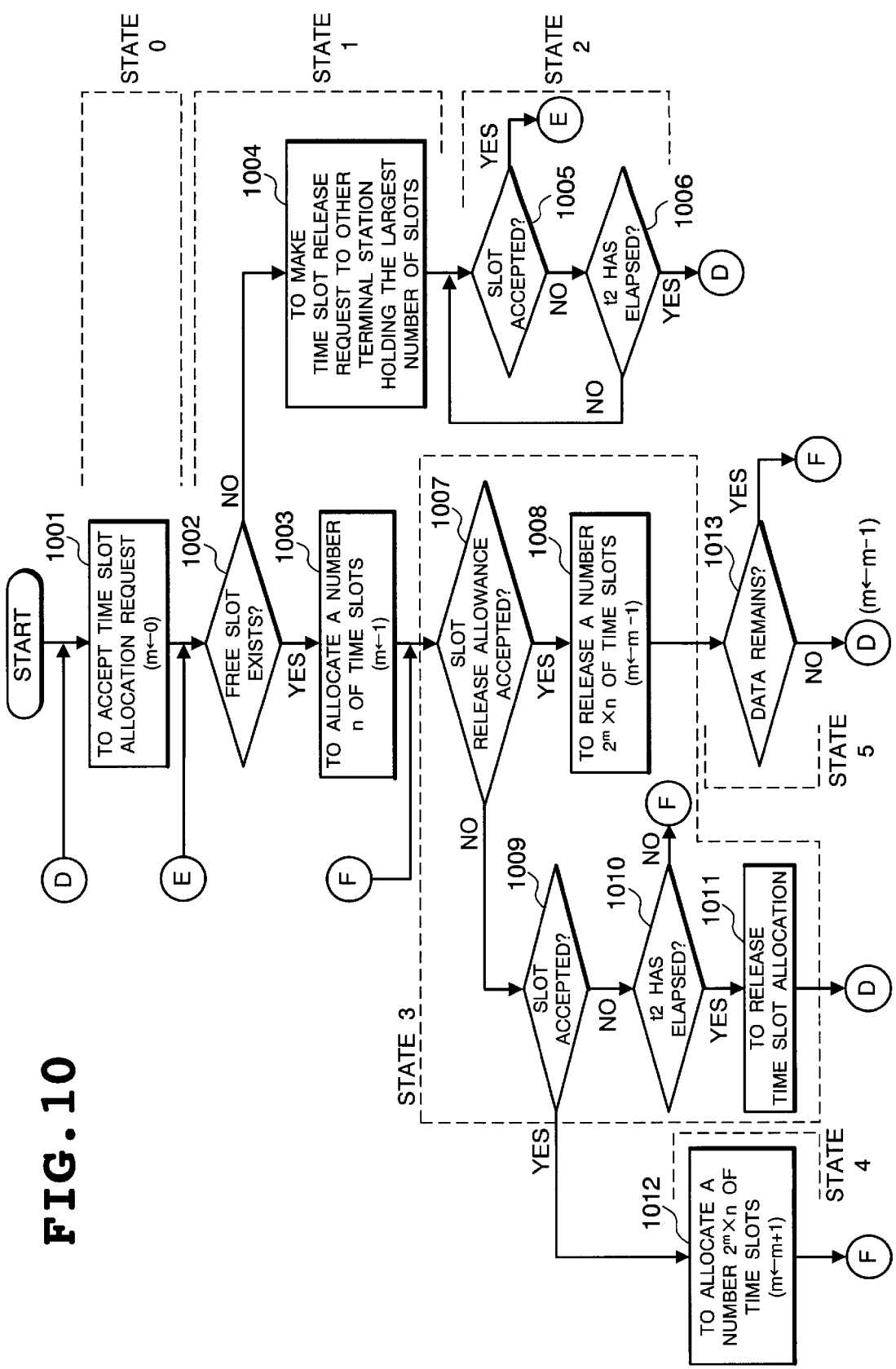
FIG. 10 is a flow chart showing operation of the base station in the present embodiment.

In the present embodiment, operation of the terminal station 10 is the same as that of the terminal station 10 in the first embodiment. FIG. 9 is a diagram showing state transition of the base station side finite state machine 22 of the base station 20 in the present embodiment and FIG. 10 is a flow chart showing operation of the base station 20. Operation of the base station 20 described in the following is the operation related only to one terminal station 10. In reality, the base station 20 conducts the same operation for a plurality of the terminal stations 10.

In FIG. 9, the state 0 is a state where no time slot allocation request is made by the terminal station 10. At this state, a value of the variable m is assumed to be "0". The state 1 is a state where the base station 20 accepts a time slot allocation request from the terminal station 10 and conducts no allocation of a time slot to the terminal station 10 in question. The state 2 is a state of waiting for a time slot to be freed. The state 3 is a state where a time slot is allocated to a terminal station 10 which has made a time slot allocation request. The state 4 is a state where after a time slot is allocated, an additional time slot allocation request is made. The state 5 is a state where a necessary time slot is released.

With reference to the flow chart of FIG. 10, operation of the base station 20 will be described. First, when at the base station 20 at the state 0, the control message identification unit 21 accepts a time slot allocation request transmitted from a predetermined terminal station 10, the unit 21 sends the time slot allocation request in question to the base station side finite state machine 22 to shift to the state 1 (Step 1001).

When at the base station 20 at the state 1, a number n of time slots are free, the base station side finite state machine 22 allocates the number n of free time slots to the terminal station 10 which has sent the time slot allocation request in question and sets the value of the variable m to "1" to shift to the state 3 (Steps 1002 and 1003). When the time slot is not free, (Steps 1002 and 1003). When the time slot is not free, the station 20 makes a time slot release request to the terminal station side finite state machine 12 of a terminal station 10 having the largest number of time slots among other terminal stations 10 (hereinafter referred to as other terminal station) than the terminal station 10 which has sent the time slot allocation request in question to shift to the state 2 (Steps 1002 and 1004).

When the base station 20 at the state 2 receives another time slot allocation request made by the terminal station 10 which has sent the time slot allocation request in question within the fixed time (t2) that is longer than the time t1, the station 20 shifts to the state 1 (Steps 1005 and 1006). When no time slot allocation request is made by the terminal station 10 which has sent the time slot allocation request in question within the time t2, the station 20 shifts to the state 0 (Steps 1005 and 1006).

When the base station 20 at the state 3 accepts allowance of slot release from the finite state machine 12 of other terminal station 10, the station 20 sets the value of the variable m to m−1 and releases a number $2^m \times n$ of slots to shift to the state 5 (Steps 1007 and 1008). When no allowance of slot release arrives from the finite state machine 12 of other terminal station 10 and a further time slot allocation request is received from the terminal station 10 which has sent the time slot allocation request in question within the time t2, the station 20 shifts to the state 4 (Steps 1007, 1009 and 1010). When no allowance of slot release arrives from the finite state machine 12 of other terminal station 10 and none of new time slot allocation requests is made by the terminal station 10 which has sent the time slot allocation request in question within the time t2, the station 20 releases all the time slot allocation to the terminal station 10 in question to shift to the state 0 (Step 1007 and Steps 1009 through 1011).

When at the base station 20 at the state 4, a number $2^m \times n$ of time slots are free, the station 20 allocates the number $2^m \times n$ of time slots to the terminal station 10 which has sent the time slot allocation request in question and sets the value of the variable m to m+1. Then, irrespective of whether allocation of the number $2^m \times n$ of time slots is conducted, the station 20 returns to the state 3 (Step 1012).

When at the base station 20 at the state 5, after the number $2^m \times n$ of free time slots are released, there still remains a time slot allocated to the terminal station 10 in question, the base station 20 returns to the state 3 (Step 1013). When all the time slots allocated to the terminal station 10 in question are released and remains none, the station 20 returns to the state 0 (Step 1013).

As described in the foregoing, according to the present embodiment, to the first time slot allocation request, a number n of time slots are allocated and to the m-th (excluding the first allocation request) time slot allocation request subsequently made, a number $2^m \times n$ of time slots are allocated, whereby a large amount of time slots can be allocated in response to a small number of requests. In the present embodiment, various allocation methods can be adopted according to traffic characteristics such as allocating a number m×n of time slots in response to the m-th time slot allocation request successively made in place of allocating the number $2^m \times n$ of time slots.

Figure 11:
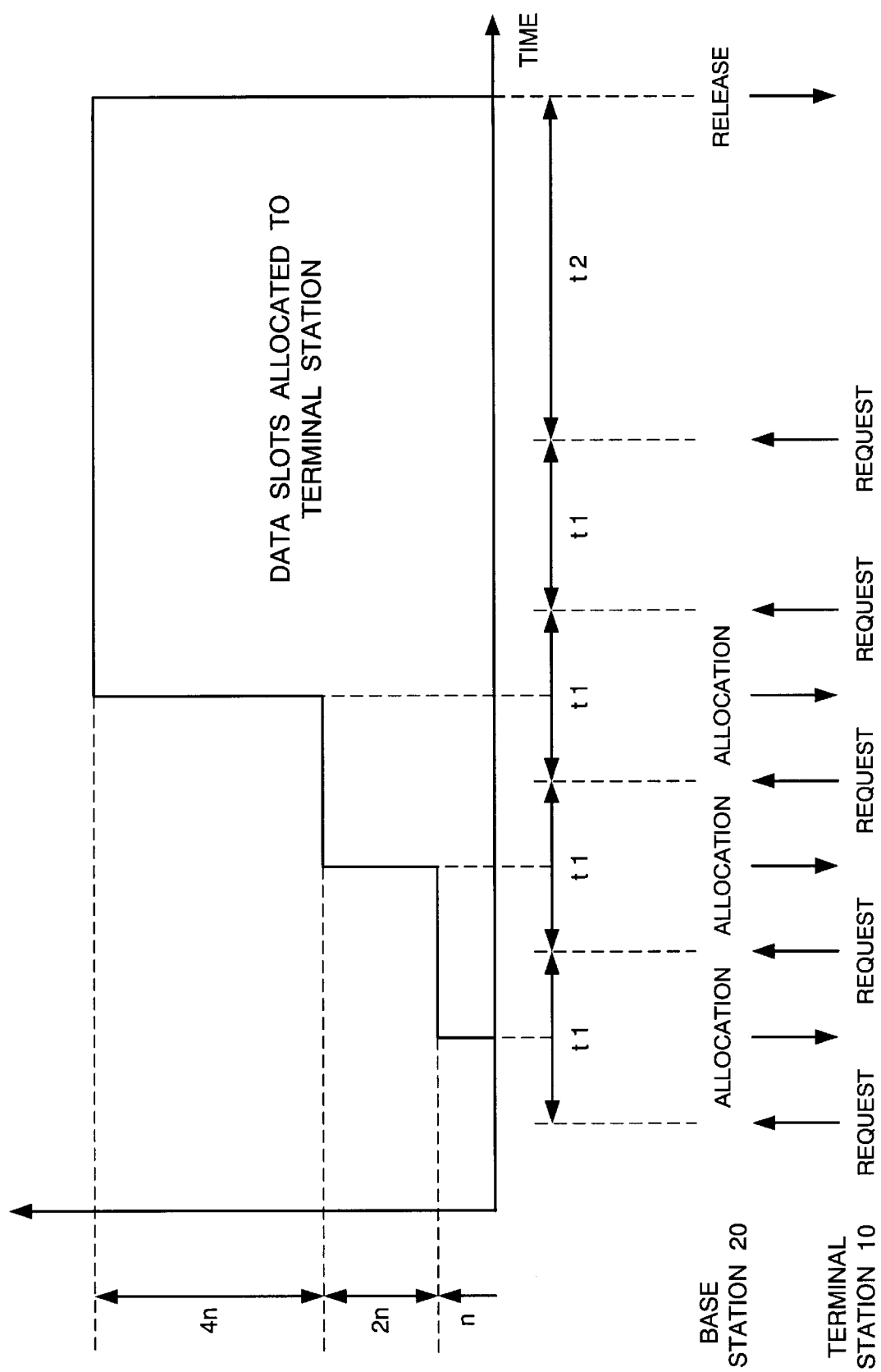
FIG. 11 is a time chart showing an execution example of time slot allocation in the present embodiment.

FIG. 11 is a time chart showing an example of execution of time slot allocation in the present embodiment. With reference to FIG. 11, after the first time slot allocation request is made by the terminal station 10, a time slot allocation request is made four times every time period of t1. Then, in response to the first through the third time slot allocation requests, the base station 20 allocates time slots. As illustrated in the figure, in response to the first time slot allocation request, a number n ($=2^0 \times n$) of time slots are allocated, in response to the second time slot allocation request, a number 2n ($=2^1 \times n$) of time slots are allocated and in response to the third time slot allocation request, a number 4n ($=2^2 > n$) of time slots are allocated. However, after the fourth time slot allocation request, no time slot allocation is conducted before the fifth time slot allocation request is made. In addition, after the fifth time slot allocation request is made, no time slot allocation request to follow is made by the terminal station 10 before the time t2 elapses. Accordingly, at the time point where the time t2 has elapsed, the base station 20 would have released the time slots allocated to the terminal station 10 in question.

Description will be next made of a further embodiment of the present invention. A data communication system of the present embodiment is structured similarly to the data communication system of the first embodiment shown in FIGS. 1 and 2. The present embodiment differs from the first and the second embodiments in a time slot allocation method by the base station side finite state machine 22 of the base station 20. In the time slot allocation method of the present embodiment, when a predetermined terminal station 10 makes a plurality of time slot allocation requests, the station 20 releases time slots allocated to other terminal stations 10 as required in response to each time slot allocation request. Into the present embodiment, the variable m which is introduced into the second embodiment is also introduced.

Figure 12:
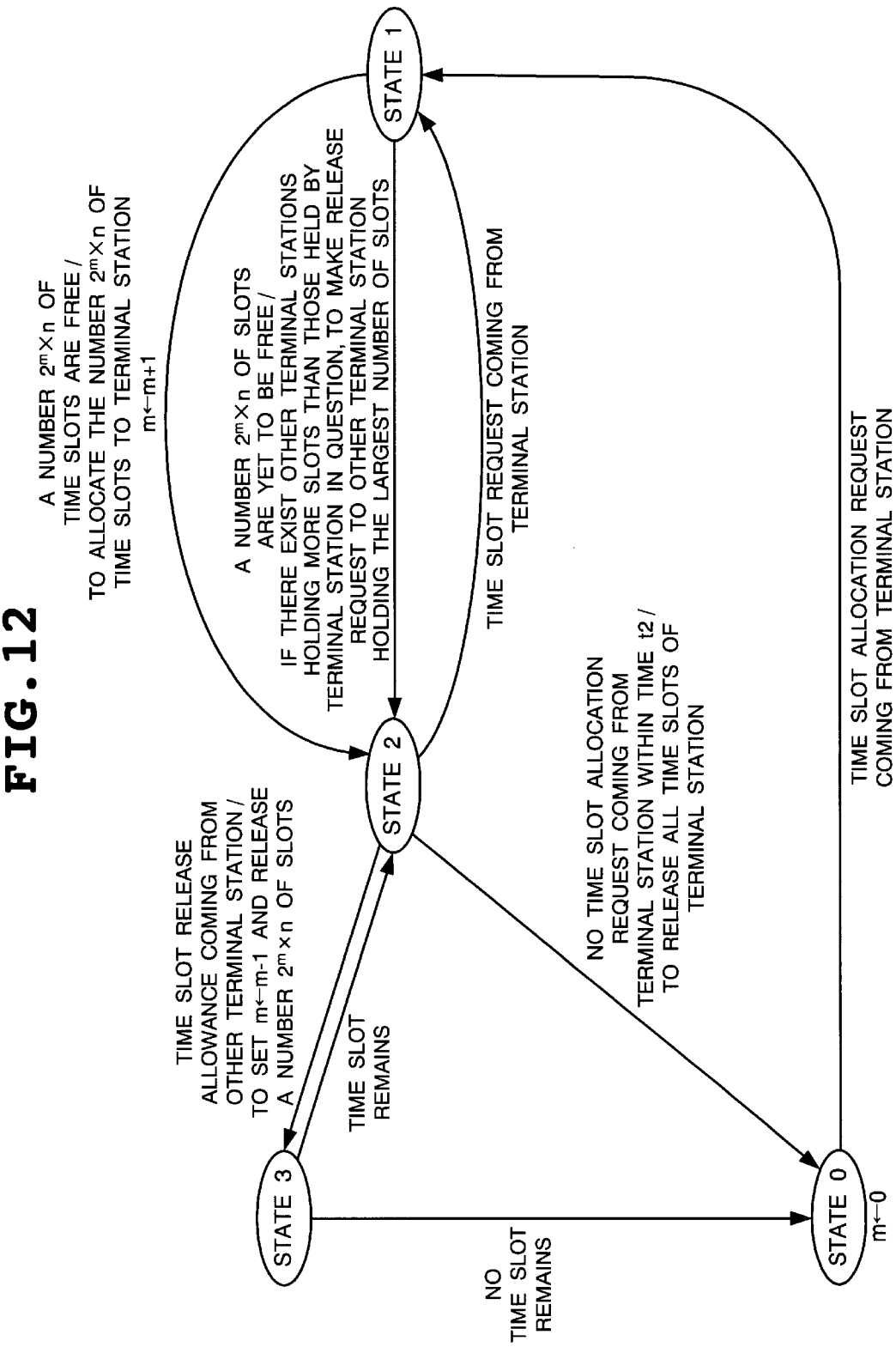
FIG. 12 is a diagram showing state transition of a base station side finite state machine of a base station constituting a data communication system according to a further embodiment of the present invention.
Figure 13:
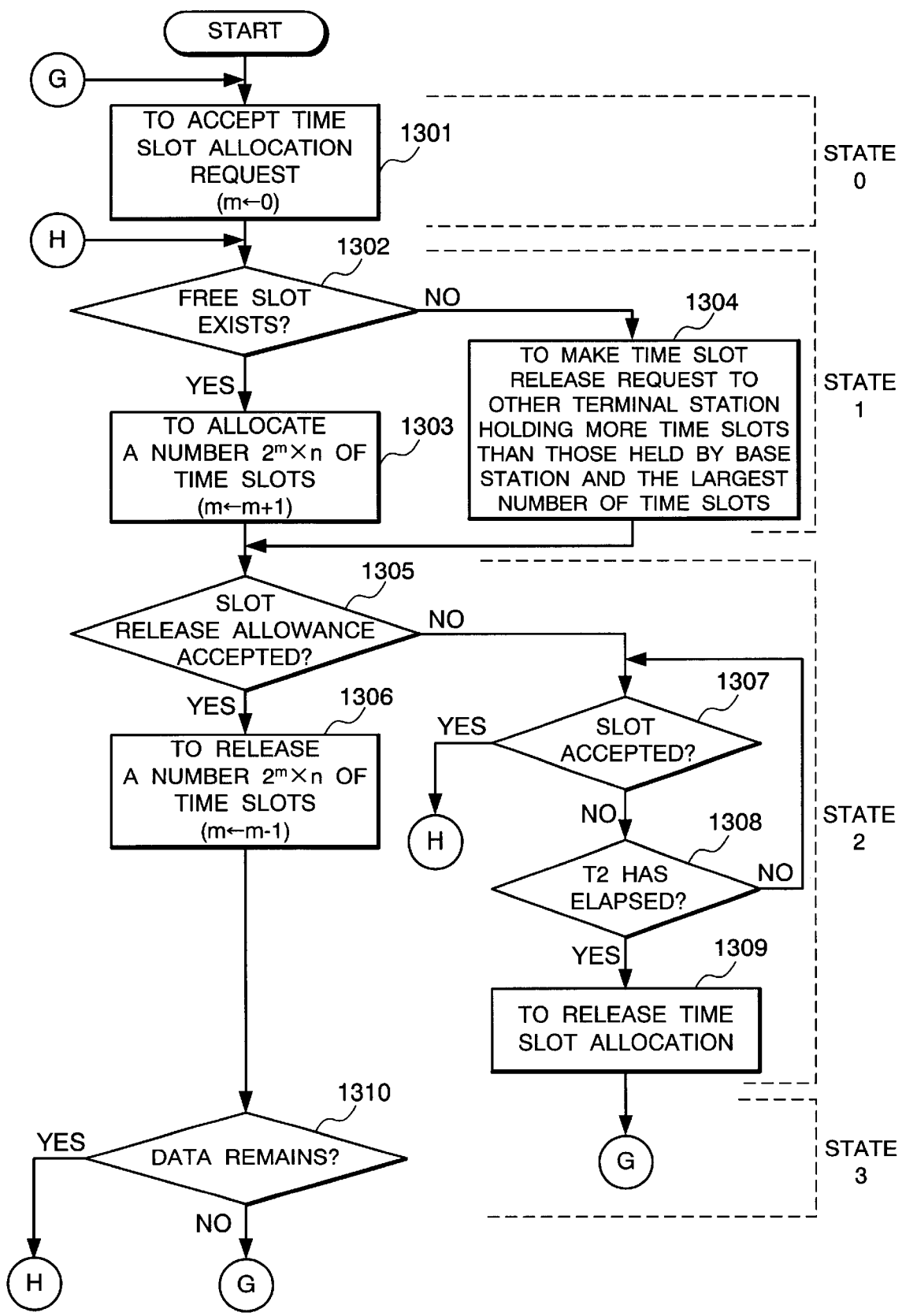
FIG. 13 is a flow chart showing operation of the base station in the present embodiment.
Figure 14:
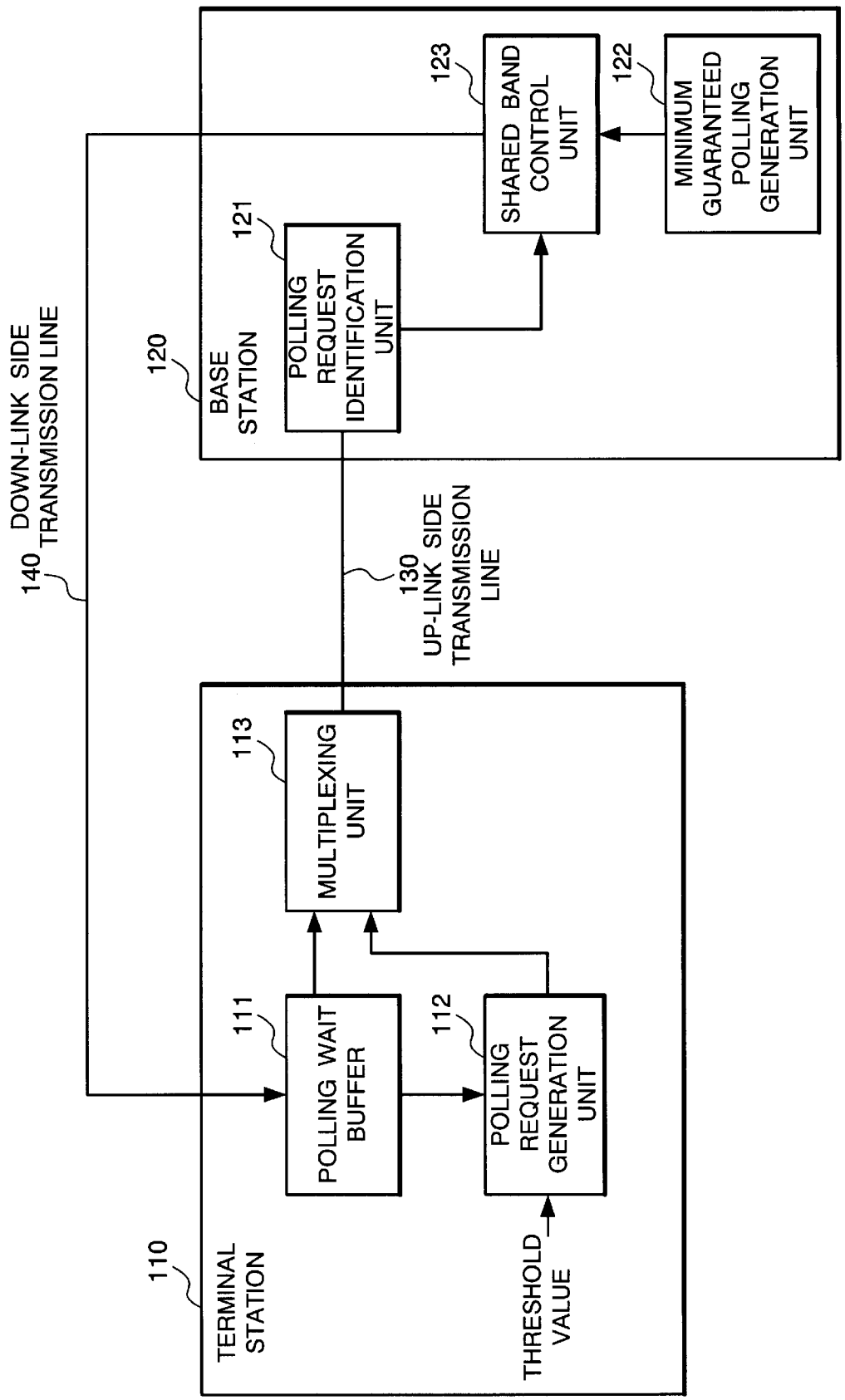
FIG. 14 is a block diagram showing a structure of a conventional data communication system.

In the present embodiment, operation of the terminal station 10 is the same as that of the terminal station 10 in the first embodiment. FIG. 12 is a diagram showing state transition of the base station side finite state machine 22 of the base station 20 in the present embodiment and FIG. 13 is a flow chart showing operation of the base station 20. Operation of the base station 20 which will be described below is the operation related only to one terminal station 10. In reality, the base station 20 conducts the same operation for a plurality of terminal stations 10.

In FIG. 12, the state 0 is a state where no time slot allocation request is made by the terminal station 10. At this state, the value of the variable m is assumed to be "0". The state 1 is a state where the station 20 accepts a time slot allocation request from the terminal station 10 and conducts no time slot allocation to the terminal station 10 in question. The state 2 is a state where the station 20 allocates a time slot to the terminal station 10 which has made a time slot allocation request or waits for a time slot to be freed. The state 3 is a state where a necessary time slot is released.

Operation of the base station 20 will be described with reference to the flow chart of FIG. 13. First, when at the base station 20 at the state 0, the control message identification unit 21 accepts a time slot allocation request transmitted from a predetermined terminal station 10, the unit 21 sends the time slot allocation request in question to the base station side finite state machine 22 to shift to the state 1 (Step 1301).

When at the base station 20 at the state 1, a number $2^m \times n$ of time slots are free, the base station side finite state machine 22 allocates the number $2^m \times n$ of free time slots in question to the terminal station 10 which has sent the time slot allocation request in question and sets the value of the variable m to m+1 to shift to the state 2 (Steps 1302 and 1303). When the time slot is not free, the station 20 makes a time slot release request to the terminal station side finite state machine 12 of other terminal station 10 which is among other terminal stations 10 (hereinafter referred to as other terminal station 10) than the terminal station which has sent the time slot allocation request in question and which holds the largest number of time slots among other terminal stations 10 holding more time slots than those held by the base station 20 to shift to the state 2 (Steps 1302 and 1304).

When at the base station 20 at the state 2, the value of the variable m is not "0" and allowance of slot release is received from the finite state machine 12 of other terminal station 10, the station 20 sets the value of the variable m to m−1 and releases the number $2^m \times n$ of time slots to shift to the state 3 (Steps 1305 and 1306). When no allowance of slot release arrives from the finite state machine 12 of other terminal station 10 and a further time slot allocation request is received from the terminal station 10 which has sent the time slot allocation request in question within the fixed time (t2) longer than the time t1, the station 20 shifts to the state 1 (Steps 1305, 1307 and 1308). When no allowance of slot release arrives from the finite state machine 12 of other terminal station 10 and none of new time slot allocation requests is made by the terminal station 10 which has sent the time slot allocation request in question within the time t2, the station 20 releases all the time slot allocation to the terminal station 10 in question to shift to the state 0 (Steps 1305, and 1307 to 1309).

When at the base station 20 at the state 3, after the number $2^m \times n$ of free time slots are released, there still remains a time slot allocated to the terminal station 10 in question, the station 20 returns to the state 2 (Step 1310). When the time slots allocated to the terminal station 10 are all released and left none, the station 20 returns to the state 0 (Step 1310).

Thus, according to the present embodiment, in response not only to the first time slot allocation request but also to additional time slot allocation requests to follow, a time slot release request is made to a terminal station 10 holding more time slots than those held by the base station 20, so that distribution of time slots to the respective terminal stations 10 which make a time slot allocation request is averaged.

As described in the foregoing, according to the data communication system and the time slot allocation method, and the storage medium storing the time slot allocation control program of the present invention, it is unnecessary for the terminal station 10 to measure the amount of information accumulated and queuing at the data buffer 11, so that data transfer processing can be simplified to realize high-speed data transfer.

In addition, since to the terminal station 10, a small number (a number n) of time slots are first allocated and when a time slot allocation request is continuously output from the terminal station 10 in question, a time slot is responsively added to the allocation, time slots can be flexibly allocated as required.

Also, allocating a number $2^m \times n$ of time slots in response to the m-th successive time slot allocation request enables allocation of a large number of time slots by a reduced number of requests, which is effective against a burst of traffic.

In this case, it is also possible to adopt various allocation methods according to traffic characteristics such as allocating a number m×n of time slots in response to the m-th successive time slot allocation request in place of allocating the number $2^m \times n$ of time slots, which makes flexible time slot allocation possible.

Furthermore, making a time slot release request to a terminal station 10 holding more time slots than those held by the base station 20 in response not only to the first time slot allocation request but also to additional time slot allocation requests to follow results in averaging distribution of time slots to the respective terminal stations 10 which make a time slot allocation request, thereby enabling efficient data communication.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data communication system having one base station and a plurality of terminal stations for conducting data communication from the terminal stations to the base station as time-sharing communication, wherein
said terminal station comprising:
a data buffer for storing data to be transmitted, and
time slot allocation request means for, when data is accumulated at said data buffer, periodically making a request for allocation of time slots to said base station until the accumulated data is all transmitted, and
said base station comprising:
time slot allocation means for, when accepting a time slot allocation request from said terminal station, if a free time slot exists, allocating the free time slot to said terminal station and if not, making other said terminal station which has been already allocated a time slot release the allocated time slot and allocating the released time slot to said terminal station which has made the time slot allocation request,
said data buffer of said terminal station transmitting data using a time slot allocated by said time slot allocation means of said base station.

2. The data communication system as set forth in claim 1, wherein
said time slot allocation means of said base station allocates time slots with a predetermined number of slots added thereto in response to continuous time slot allocation requests from said time slot allocation request means of said terminal stations.

3. The data communication system as set forth in claim 1, wherein
said time slot allocation means of said base station increases the number of time slots to be allocated in response to continuous time slot allocation requests from said time slot allocation request means of said terminal stations by stages according to the number of requests.

4. The data communication system as set forth in claim 1, wherein
said time slot allocation means of said base station, in response to continuous time slot allocation requests from said time slot allocation request means of said terminal stations, makes, for each request, said terminal station holding the largest number of time slots among said terminal stations holding more time slots than those held by said base station release a necessary number of time slots.

5. The data communication system as set forth in claim 1, wherein
said time slot allocation means of said base station allocates time slots with a predetermined number of slots added thereto in response to continuous time slot allocation requests from said time slot allocation request means of said terminal stations, and
said time slot allocation means of said base station, in response to continuous time slot allocation requests from said time slot allocation request means of said terminal stations, makes, for each request, said terminal station holding the largest number of time slots among said terminal stations holding more time slots than those held by said base station release a necessary number of time slots.

6. The data communication system as set forth in claim 1, wherein
said time slot allocation means of said base station increases the number of time slots to be allocated in response to continuous time slot allocation requests from said time slot allocation request means of said terminal stations by stages according to the number of requests, and
said time slot allocation means of said base station, in response to continuous time slot allocation requests from said time slot allocation request means of said terminal stations, makes, for each request, said terminal station holding the largest number of time slots among said terminal stations holding more time slots than those held by said base station release a necessary number of time slots.

7. The data communications system as set forth in claim 1, wherein said time slot allocation-request means comprises:
a finite state machine for determining when to make the request for allocation of time slots to said base station,
wherein said finite state machine operates in one of a first state, a second state, and a third state:
said first state corresponding to a state in which no said terminal station has no time slot allocated to it and no data is to be transmitted to said base station;

said second state corresponding to a state in which said terminal station has transmitted a time slot allocation request to said base station and is awaiting a time slot allocation from said base station; and said third state corresponding to a state in which data transmission by said terminal station to said base station is enabled, and in which the data transmission is sent over a time slot allocated by said base station to said terminal station, wherein said finite state machine transitions from the first state to the second state when data to be sent exists at said terminal station, wherein said finite state machine transitions from the second state to the first state when no time slot allocation has been received from said base station within a time t1 after said terminal station output a time slot allocation request, wherein said finite state machine transitions from the second state to the third state upon receiving a time slot allocation from said base station, and wherein said finite state machine transitions from the third state to the first state when no time slot allocation exists or when the time t1 has elapsed and no data to be transmitted to said base station exists at said terminal station.

8. The data communications system as set forth in claim 1, wherein said time slot allocation means comprises:

a finite state machine for determining when to make the request for allocation of time slots to said base station, wherein said finite state machine operates in one of a first state, a second state, a third state, a fourth state, a fifth state and a sixth state:

said first state corresponding to an initial state of said base station;

said second state corresponding to a state in which said base station has received a time slot allocation request sent from said terminal station; and said third state corresponding to a state in which said base station outputs a time slot release request to another terminal station if the time slot allocation request sent by said terminal station cannot be satisfied otherwise, wherein said finite station machine transitions from said third state to said second state when another time slot allocation request is received from said terminal station within a time t2 after receiving said time slot allocation request from said terminal station, and wherein said finite station machine transitions from said third state to said first state when no other time slot allocation request is received from said terminal station within the time t2 after receiving said time slot allocation request from said terminal station;

said fourth state corresponding to a state in which said base station receives the time slot allocation request sent from said terminal station and there exist a number of available time slots to satisfy the time slot allocation request;

said fifth state corresponding to a state in which said base station receives another time slot allocation request sent from said terminal station when said base station is currently in said fourth state, wherein said finite state machine transitions to said fourth state and allocates available time slots to said terminal station based on said another time slot allocation request;

said sixth state corresponding to a state in which said base station receives a time slot release allowance from another terminal station to release time slots while said base station is currently in said fourth state and wherein said base station allocates at least one said the time slots released to said terminal station, wherein said finite station machine transitions to said fourth state when time slots to be allocated to said terminal station remain and said finite state machine transitions to said first state when no time slots to be allocated to said terminal station remain, and wherein said finite state machine transitions from said fourth state to said first state when no other time slot allocation request is received from said terminal station within the time t2 so that no time slots are released to said terminal station.

9. In a data communication system having one base station and a plurality of terminal stations for conducting data communication from the terminal stations to the base station as time-sharing communication, a time slot allocation method of allocating time slots to the terminal stations, comprising the steps of:

when data is accumulated at said data buffer, periodically making a request for allocation of time slots by said terminal station to said base station until the accumulated data is all transmitted; and when said base station accepts a time slot allocation request from said terminal station, if a free time slot exists, allocating the free time slot by said base station to said terminal station and if not, making other said terminal station which has been already allocated a time slot release the allocated time slot and allocating the released time slot to said terminal station which has made the time slot allocation request.

10. The time slot allocation method as set forth in claim 9, wherein said base station allocates time slots with a predetermined number of slots added thereto in response to continuous time slot allocation requests from said terminal stations.

11. The time slot allocation method as set forth in claim 9, wherein said base station increases the number of time slots to be allocated in response to continuous time slot allocation requests from said terminal stations by stages according to the number of requests.

12. The time slot allocation method as set forth in claim 9, wherein said base station, in response to continuous time slot allocation requests from said terminal stations, makes, for each request, said terminal station holding the largest number of time slots among said terminal stations holding more time slots than those held by said base stations release a necessary number of time slots.

13. The time slot allocation method as set forth in claim 9, wherein said base station allocates time slots with a predetermined number of slots added thereto in response to continuous time slot allocation requests from said terminal stations, and said base station, in response to continuous time slot allocation requests from said terminal stations, makes, for each request, said terminal station holding the largest number of time slots among said terminal stations holding more time slots than those held by said base station release a necessary number of time slots.

14. The time slot allocation method as set forth in claim 9, wherein said base station increases the number of time slots to be allocated in response to continuous time slot allocation requests from said terminal stations by stages according to the number of requests, and said base station, in response to continuous time slot allocation requests from said terminal stations, makes, for each request, said terminal station holding the largest number of time slots among said terminal stations holding more time slots than those held by said base station release a necessary number of time slots.

15. The time slot allocation method according to claim 9, wherein the step of periodically making a request for allocation comprises the steps of:

outputting the request for allocation of time slots only when a finite state machine of said terminal station is in either a first state or a third state, but not in a second state, said first state corresponding to a state in which no said terminal station has no time slot allocated to it and no data is to be transmitted to said base station;

said second state corresponding to a state in which said terminal station has transmitted a time slot allocation request to said base station and is awaiting a time slot allocation from said base station; and said third state corresponding to a state in which data transmission by said terminal station to said base station is enabled, and in which the data transmission is sent over a time slot allocated by said base station to said terminal station, wherein said finite state machine transitions from the first state to the second state when data to be sent exists at said terminal station, wherein said finite state machine transitions from the second state to the first state when no time slot allocation has been received from said base station within a time t1 after said terminal station output a time slot allocation request, wherein said finite state machine transitions from the second state to the third state upon receiving a time slot allocation from said base station, and wherein said finite state machine transitions from the third state to the first state when no time slot allocation exists or when the time t1 has elapsed and no data to be transmitted to said base station exists at said terminal station.

16. A computer readable memory storing a time slot allocation control program for controlling a data communication system having one base station and a plurality of terminal stations for conducting data communication from the terminal stations to the base station as time-sharing communication to allocate time slots to the terminal stations, said time slot allocation control program comprising the steps of:

controlling said terminal stations to, when data is accumulated at said data buffer, periodically make a request for allocation of time slots to said base station until the accumulated data is all transmitted, and controlling said base station to, when said base station accepts a time slot allocation request from said terminal station, if a free time slot exists, allocate the free time slot to said terminal station and if not, make other said terminal station which has been already allocated a time slot release the allocated time slot and allocate the released time slot to said terminal station which has made the time slot allocation request.

17. The computer readable memory which stores a time slot allocation control program as set forth in claim 16, wherein said time slot allocation control program controls said base station to allocate time slots with a predetermined number of slots added thereto in response to continuous time slot allocation requests from said terminal stations.

18. The computer readable memory which stores a time slot allocation control program as set forth in claim 13, wherein said time slot allocation control program controls said base station to increase the number of time slots to be allocated in response to continuous time slot allocation requests from said terminal stations by stages according to the number of requests.

19. The computer readable memory which stores a time slot allocation control program as set forth in claim 16, wherein said time slot allocation control program controls said base station to make, in response to continuous time slot allocation requests from said terminal stations, for each request, said terminal station holding the largest number of time slots among said terminal stations holding more time slots than those held by said base station release a necessary number of time slots.

20. The computer readable memory which stores a time slot allocation control program as set forth in claim 16, wherein said time slot allocation control program controls said base station to allocate time slots with a predetermined number of slots added thereto in response to continuous time slot allocation requests from said terminal stations, and controls said base station to make, in response to continuous time slot allocation requests from said terminal stations, for each request, said terminal station holding the largest number of time slots among said terminal stations holding more time slots than those held by said base station release a necessary number of time slots.

21. The computer readable memory which stores a time slot allocation control program as set forth in claim 16, wherein said time slot allocation control program controls said base station to increase the number of time slots to be allocated in response to continuous time slot allocation requests from said terminal stations by stages according to the number of requests, and controls said base station to make, in response to continuous time slot allocation requests from said terminal stations, for each request, said terminal station holding the largest number of time slots among said terminal stations holding more time slots than those held by said base station release a necessary number of time slots.

22. The computer readable memory which stores a time slot allocation control program as set forth in claim 16, wherein said time slot allocation control program outputs the request for allocation of time slots only when a finite state machine of said terminal station is in either a first state or a third state, but not in a second state, said first state corresponding to a state in which no said terminal station has no time slot allocated to it and no data is to be transmitted to said base station;

said second state corresponding to a state in which said terminal station has transmitted a time slot allocation request to said base station and is awaiting a time slot allocation from said base station; and said third state corresponding to a state in which data transmission by said terminal station to said base station is enabled, and in which the data transmission is sent over a time slot allocated by said base station to said terminal station, wherein said finite state machine transitions from the first state to the second state when data to be sent exists at said terminal station, wherein said finite state machine transitions from the second state to the first state when no time slot allocation has been received from said base station within a time t1 after said terminal station output a time slot allocation request, wherein said finite state machine transitions from the second state to the third state upon receiving a time slot allocation from said base station, and wherein said finite state machine transitions from the third state to the first state when no time slot allocation exists or when the time t1 has elapsed and no data to be transmitted to said base station exists at said terminal station.

* * * * *